United States Patent [19]

Allen et al.

[11] Patent Number: 5,247,042

[45] Date of Patent: * Sep. 21, 1993

[54] ISOTROPIC ACRYLIC POLYMER EXHIBITING NONLINEAR OPTICAL RESPONSE

[75] Inventors: Diane E. Allen, Chatham; Ronald N. DeMartino, Wayne; Hyun-Nam Yoon, New Providence, all of N.J.

[73] Assignee: Hoechst Celanese Corp., Somerville

[*] Notice: The portion of the term of this patent subsequent to Mar. 26, 2008 has been disclaimed.

[21] Appl. No.: 405,503

[22] Filed: Sep. 11, 1989

[51] Int. Cl.$^5$ .................. C08F 22/00; C08F 26/00; C08F 126/00; C09K 19/00

[52] U.S. Cl. .................. 526/310; 526/243; 526/248; 526/288; 526/297; 526/298; 526/312; 252/299.01; 560/73

[58] Field of Search ............... 526/312, 313, 310, 312, 526/243, 288, 248, 298, 297; 252/299.01; 428/1; 560/73

[56] References Cited

U.S. PATENT DOCUMENTS

| | | | |
|---|---|---|---|
| 4,925,589 | 5/1990 | Lorenz | 526/312 |
| 5,002,361 | 3/1991 | DeMartino et al. | 350/96.34 |
| 5,024,785 | 6/1991 | Hefner et al. | 252/299.01 |
| 5,044,725 | 9/1991 | DeMartino et al. | 252/299.01 |

Primary Examiner—Paul R. Michl
Assistant Examiner—Tae H. Yoon
Attorney, Agent, or Firm—P. S. Kalyanaraman

[57] ABSTRACT

This invention provides novel side chain polymers which exhibit nonlinear optical response, and which have utility as a transparent optical component in all-optical and electrooptical light switch and light modulator devices.

An invention side chain polymer is illustrated by the following structure:

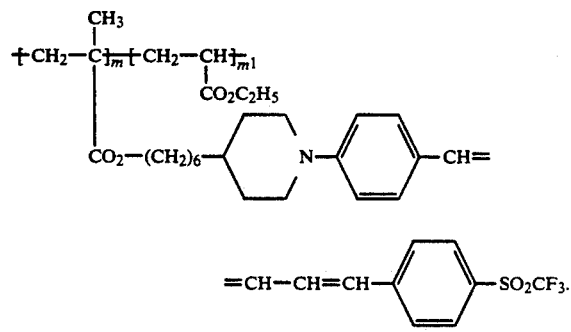

1 Claim, No Drawings

ISOTROPIC ACRYLIC POLYMER EXHIBITING NONLINEAR OPTICAL RESPONSE

This invention was made with Government support under Contract Number F49620-87-C-0115 awarded by the Department of Defense. The Federal Government has certain rights in this invention.

CROSS-REFERENCE TO RELATED PATENT APPLICATIONS

The present patent application has subject matter related to the disclosure of copending U.S. patent application Ser. No. 915,179, filed Oct. 3, 1986, now U.S. Pat. No. 4,915,491; U.S. patent application Ser. No. 106,301, filed Oct. 9, 1987, now U.S. Pat. No. 4,808,332; U.S. patent application Ser. No. 120,253, filed Nov. 11, 1987, now U.S. Pat. No. 4,822,865; U.S. patent application Ser. No. 148,262, filed Jan. 25, 1988, now U.S. Pat. No. 4,913,844, and U.S. patent application Ser. No. 156,051, filed Feb. 16, 1988, now U.S. Pat. No. 4,826,950.

BACKGROUND OF THE INVENTION

Polymers with a comb structure of pendant side chains are a new class of organic materials which exhibit interesting optical properties.

Comb-like liquid crystalline polymers are described in Eur. Polym. J., 18, 651 (1982); Advanced Polymer Science, Liquid Crystal Polymers II/III, Springer-Verlag, New York (1984), pages 215-220; and in U.S. Pat. Nos. 4,293,435 and 4,631,328. The disclosed polymeric structures have been developed for their mesogenic optical properties which have prospective utility in opto-electronic display devices.

In U.S. Pat. Nos. 4,694,066; 4,755,574; and 4,762,912 liquid crystalline polymers are described which have pendant side chains which exhibit nonlinear optical susceptibility, in addition to mesogenic properties.

In U.S. Pat. No. 4,792,208 discloses nonlinear optically responsive organic compounds and side chain polymers in which the molecular dipoles have an electron donor moiety linked through a conjugated $\pi$ bonding system to an election acceptor sulfonyl moiety.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Thin films of organic or polymeric materials with large second order nonlinearities in combination with semiconductor-based electronic circuitry have potential as systems for laser modulation and deflection, information control in optical circuitry, and the like.

Other novel processes occurring through third order nonlinearity such as degenerate four-wave mixing, whereby real-time processing of optical information occurs, have potential utility in such diverse fields as optical communications and integrated circuit fabrication.

Liquid crystalline side chain polymers which exhibit nonlinear optical properties are suitable for application as a nonlinear optical component in optical light switch and light modulator devices. One disadvantage of a liquid crystalline side chain polymer optical medium is a loss of transmission efficiency due to light scattering by deviations from ideal mesogenic order.

There is continuing interest in the theory and practice of optically responsive polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel optically responsive monomers and polymers.

It is another object of this invention to provide acrylic homopolymers and copolymers having side chains which exhibit nonlinear optical response.

It is a further object of this invention to provide optical light switch and light modulator devices with a transparent polymeric nonlinear optical component comprising a thin film of a polymer with nonlinear optically-responsive pendant side chains which can be uniaxially oriented by an external field.

Other objects and advantages of the present invention shall become apparent from the accompanying description and examples.

DESCRIPTION OF THE INVENTION

One or more objects of the present invention are accomplished by the provision of an isotropic polymer which is characterized by recurring monomeric units corresponding to the formula:

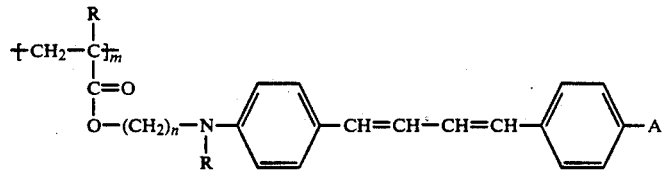

where R is hydrogen or a $C_1$-$C_4$ alkyl substituent; m is an integer of at least 5; n is an integer between about 1-20; and A is —CN, —NO$_2$, —CH=C(CN)$_2$, —C(CN)=C(CN)$_2$, —SO$_2$CF$_3$,

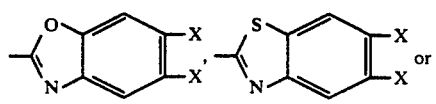

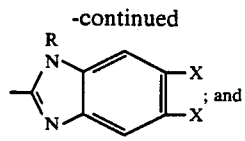

X is —H, —CN, —NO₂ or —CF₃.

In another embodiment this invention provides an isotropic polymer which is characterized by recurring monomeric units corresponding to the formula:

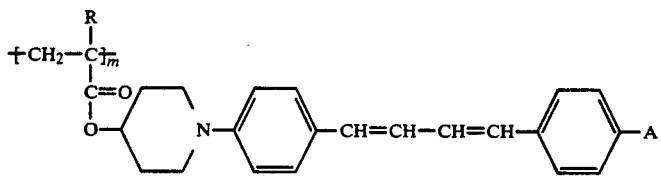

where R is hydrogen or a $C_1$-$C_4$ alkyl substituent; m is an integer of at least 5; and A is —CN, —NO₂, —CH=C(CH)₂, —C(CN)=C(CN)₂, —SO₂CF₃,

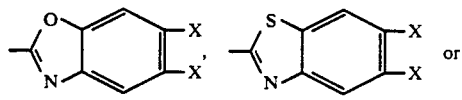

and X is —H, —CN, —NO₂ or —CF₃.

In another embodiment this invention provides an isotropic polymer which is characterized by recurring monomeric units corresponding to the formula:

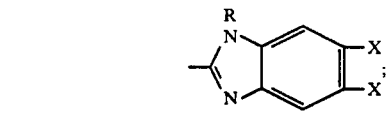
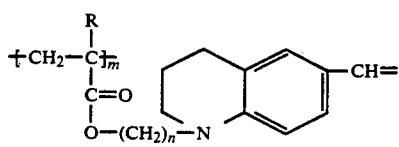

where R is hydrogen or a $C_1$-$C_4$ alkyl substituent; m is an integer of at least 5; n is an integer between about 1-20; and A is —CN, —NO₂, —CH=C(CN)₂, —C(CH)=C(CN)₂, —SO₂CF₃, X is —H, —CN, —NO₂ or —CF₃.

In another embodiment this invention provides an isotropic acrylic copolymer which is characterized by recurring monomeric units corresponding to the formula:

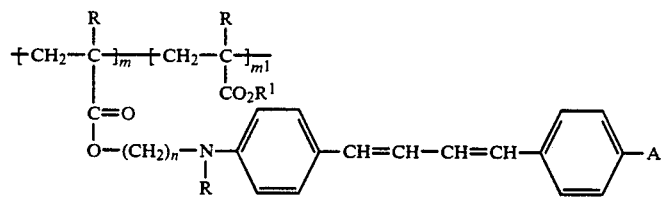

where R is hydrogen or a $C_1$-$C_4$ alkyl substituent; $R^1$ is a $C_1$-$C_6$ alkyl substituent; m and $m^1$ are integers which total at least 10; n is an integer between about 1-20; and A is —CN, —NO₂, —CH=C(CN)₂, —C(CN)=C(CN)₂, —SO₂CF₃,

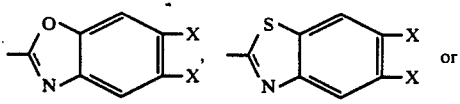
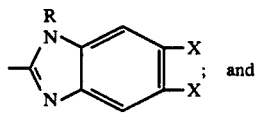

X is —H, —CN, —NO₂ or —CF₃.

In another embodiment this invention provides an isotropic acrylic copolymer which is characterized by recurring monomeric units corresponding to the formula:

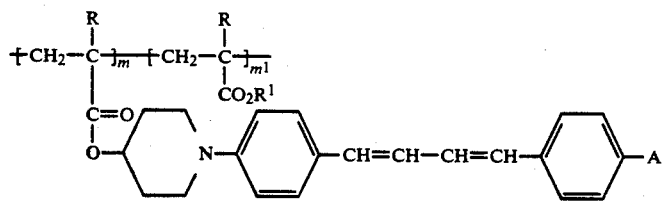

where R is hydrogen or a $C_1$-$C_4$ alkyl substituent; $R^1$ is a $C_1$-$C_6$ alkyl substituent; m and $m^1$ are integers which total at least 10; and A is —CN, —$NO_2$, —CH=C(CN)$_2$, —C(CN)=C(CN)$_2$, —$SO_2CF_3$,

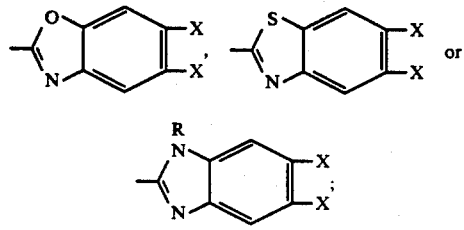

and X is —H, —CN, —$NO_2$ or —$CF_3$.

In another embodiment this invention provides an isotropic acrylic copolymer which is characterized by recurring monomeric units corresponding to the formula:

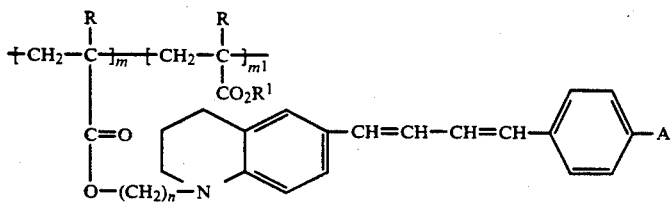

where R is hydrogen or a $C_1$-$C_4$ alkyl substituent; $R^1$ is a $C_1$-$C_6$ alkyl substituent; m and $m^1$ are integers which total at least 10; n is is an integer between about 1-20; and A is —CN, —$NO_2$, —CH=C(CN)$_2$, —C(CN)=C(CN)$_2$, —$SO_2CF_3$,

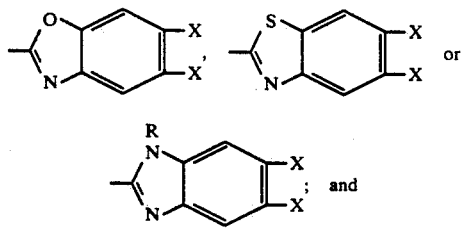

X is —H, —CN, —$NO_2$ or —$CF_3$.

A typical polymer of the present invention has a weight average molecular weight in the range between about 5000-200,000, and a glass transition temperature in the range between about 40°-175° C.

A present invention polymer has pendant side chains which exhibit nonlinear optical susceptibility $\beta$. A polymer can be formed into a nonlinear optical medium, such as a transparent film or coating on a substrate. A polymer can be applied to a supporting substrate by conventional means, such as spin coating, spraying, Langmuir-Blodgett deposition, and the like.

A film or coating fabricated with a present invention polymer exhibits third order nonlinear optical susceptibility $\chi^{(3)}$.

A nonlinear optical medium of the present invention can be subjected to an external field to uniaxially orient the polymer side chains. In one method the polymer medium is heated close to or above the polymer glass transition temperature $T_\alpha$, then an external field (e.g., a DC electric field) is applied to the medium of mobile polymer molecules to induce uniaxial molecular alignment of polymer side chains parallel to the applied field, and the medium is cooled while maintaining the external field effect.

By this method a present invention nonlinear optical medium has a stable uniaxial alignment of polymer side chains. The poled optical medium exhibits a second order nonlinear. optical susceptibility $\chi^{(2)}$. A present invention poled optical medium is capable of exhibiting a $\chi^{(2)}$ level of $2 \times 10^{-8}$ esu or higher as measured at 1.34 $\mu$m excitation wavelength.

In another embodiment this invention provides an optical light switch or light modulator device which contains a polymeric nonlinear optical component comprising a transparent solid medium of an isotropic polymer which is characterized by recurring monomeric units corresponding to the formula:

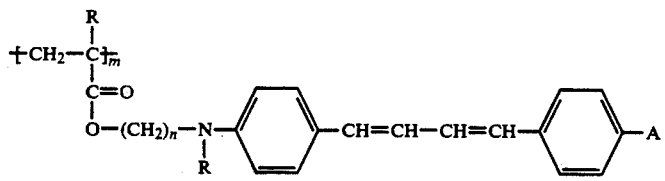

where R is hydrogen or a $C_1$-$C_4$ alkyl substituent; m is an integer of at least 5; n is an integer between about 1-20; and A is —CN, —$NO_2$, —CH=C(CN)$_2$, —C(CN)=C(CN)$_2$, —$SO_2CF_3$,

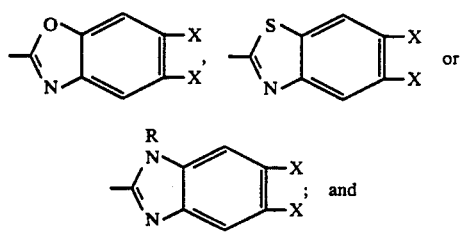

X is —H, —CN, —NO₂ or —CF₃.

In another embodiment this invention provides an optical light switch or light modulator device which contains a polymeric nonlinear optical component comprising a transparent solid medium of an isotropic polymer which is characterized by recurring monomeric units corresponding to the formula:

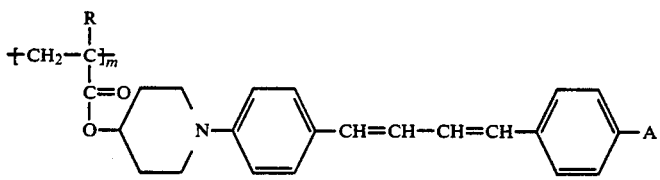

where R is hydrogen or a $C_1$-$C_4$ alkyl substituent; m is an integer of at least 5; and A is —CN, —NO₂, —CH=C(CN)₂, —C(CN)=C(CN)₂, —SO₂CF₃,

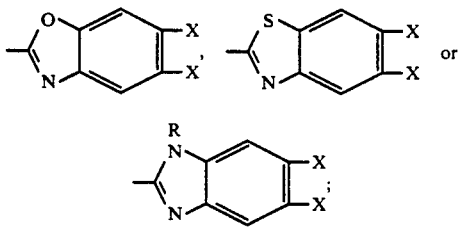

and X is —H, —CN, —NO₂ or —CF₃.

In a further embodiment this invention provides an optical light switch or light modulator device which contains a polymeric nonlinear optical component comprising a transparent solid medium of an isotropic polymer which is characterized by recurring monomeric units corresponding to the formula:

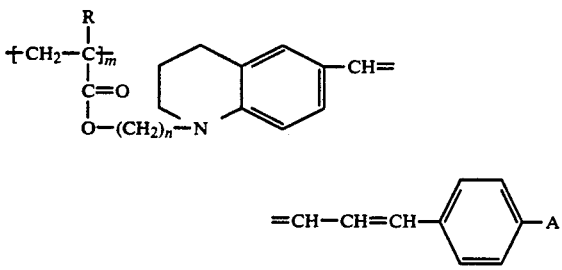

where R is hydrogen or a $C_1$-$C_4$ alkyl substituent; m is an integer of at least 5; n is an integer between about 1-20; and A is —CN, —NO₂, —CH=C(CN)₂, —C(CN)=C(CN)₂, —SO₂CF₃,

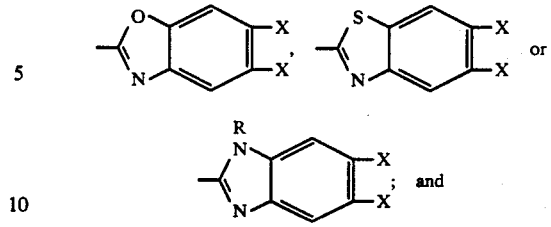

X is —H, —CN, —NO₂ or —CF₃.

In a present invention optical light switch or light modulator device, the polymeric nonlinear optical component exhibits less than about 50 percent scattering of transmitted incident light waves.

The term "transparent" as employed herein refers to a polymeric optical medium which is transparent or light transmitting with respect to incident fundamental and created light frequencies. In a present invention optical device, the polymeric thin film nonlinear optical medium component is transparent to both the incident and exit light frequencies.

The term "isotropic" as employed herein refers to a transparent polymeric optical medium in which the optical properties are equivalent in all directions.

The term "external field" as employed herein refers to an electric, magnetic or mechanical stress field which is applied to a substrate of mobile polymer molecules, to induce dipolar alignment of the polymer molecules parallel to the field.

A present invention optical device can be a laser frequency converter, an optical Kerr effect device, an electrooptical Kerr effect device, a degenerate four wave mixing device, an optical interferometric waveguide modulator, a wide-band electrooptical guided wave analog-to-digital converter, an all-optical multiplexer, an all-optical demultiplexer, an optical bistable device, an optical parametric device, and the like, as elaborated in U.S. Pat. No. 4,775,215.

The theory of nonlinear harmonic generation by frequency modulation of coherent light is elaborated by A. F. Garito et al in Chapter 1, "Molecular Optics:Nonlinear Optical Properties Of Organic And Polymeric Crystals"; ACS Symposium Series 233 (1983).

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, June 1981.

Optical parametric devices are described in U.S. Pat. Nos. 3,371,220; 3,530,301 and 3,537,020.

A present invention optical device can be achieved by constructing one of the optical devices described in the technical literature, except that a present invention polymer medium is utilized as the nonlinear optical component.

Synthesis Of Monomers And Polymers

The substituent D also can be

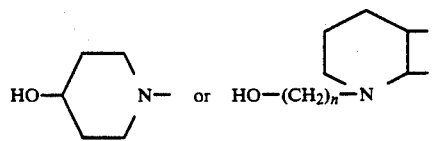

B. Intermediate

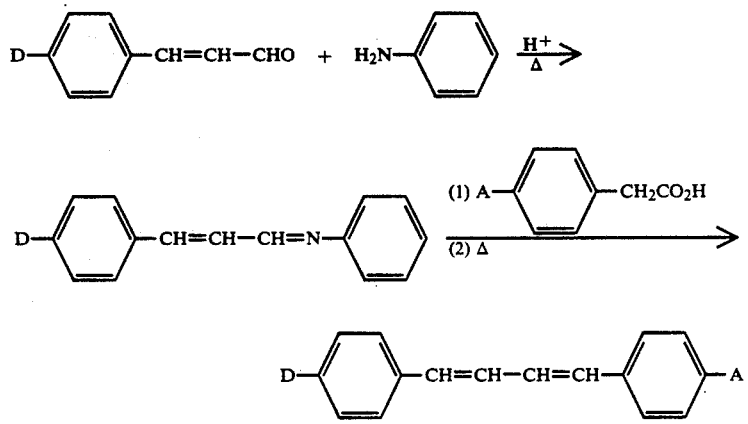

The substituent A is —CN, —NO$_2$, —CH=C(CN)$_2$, —C(CN)=C(CN)$_2$, —SO$_2$CF$_3$,

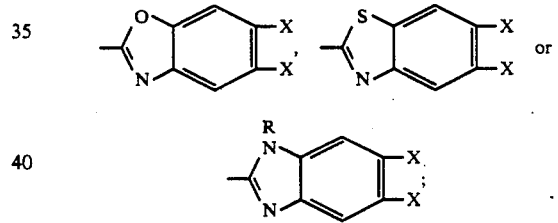

and X is —H, —CN, —NO$_2$ or —CF$_3$.

A. Starting Material

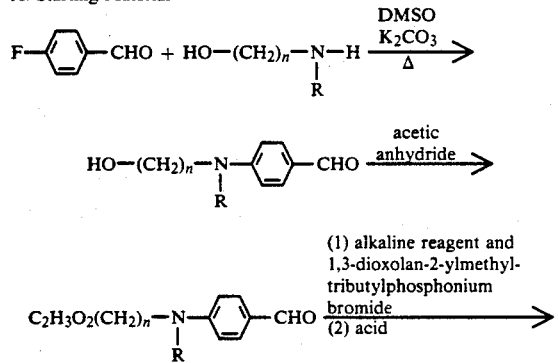

substituent D

C. Monomer

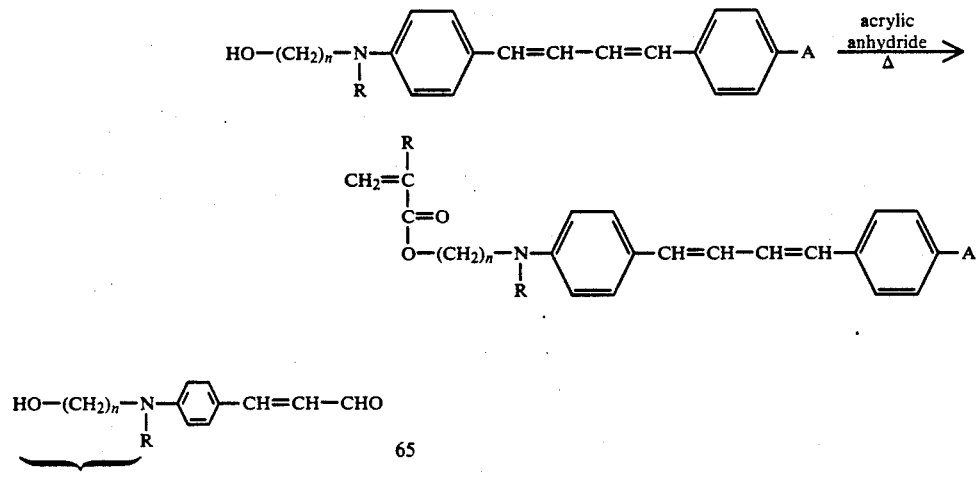

The substituent R is hydrogen or a C$_1$–C$_4$ alkyl group.

D. Copolymer

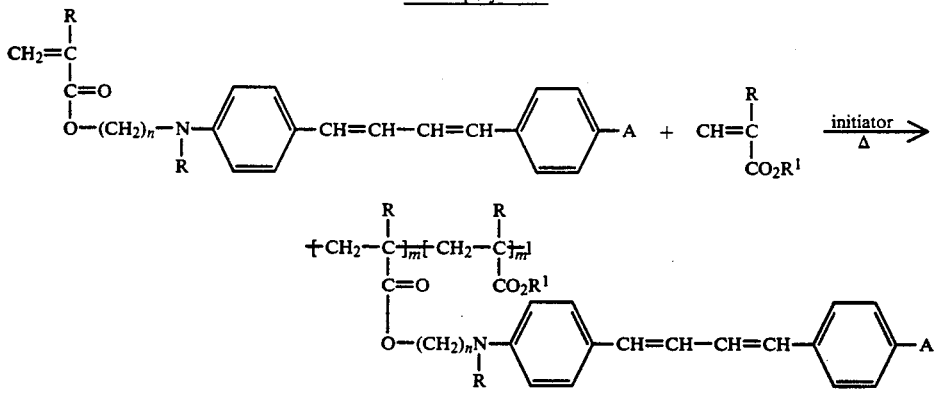

The substituent $R^1$ is a $C_1$-$C_6$ alkyl group.

E. General Procedures

All reactions are performed under an inert atmosphere using oven-dried glassware and dry solvents.

1. General procedure for production of D-substituted cinnamaldehyde starting materials To a solution of 1 mole of a donor-substituted benzaldehyde in dimethylformamide is added 2.0 moles of 1,3-dioxolan-2-yl methyltributylphosphonium bromide in dimethylformamide, and the mixture is heated at 90° C. Potassium t-butoxide (2.0 moles) is added, and heating is continued at 90° C. for 16 hours. After cooling to room temperature, the solution is poured into a sevenfold excess of water, the aqueous mixture is saturated with sodium chloride, and the solution is extracted with three portions of ether. The combined organics are dried over 4A sieves, filtered through cotton, and evaporated. The crude reaction product then is dissolved in 3M HCl, and the reaction is stirred at room temperature for 16 hours. After neutralization with saturated sodium bicarbonate, the aqueous mixture is extracted with three portions of ether, and the combined organics are dried over 4A sieves, filtered through cotton, and evaporated to yield the cinnamaldehyde as an oil. The product is purified by flash chromatography (silica gel, hexane:ethyl acetate).

2. General procedures for production of diphenylbutadiene intermediates

(a) Method 1

The appropriate cinnamaldehyde (1 mole), aniline (1 equiv.) and toluenesulfonic acid (1 mole %) are dissolved in toluene, and the reaction is heated at reflux with azeotropic removal of water for 17 hours. Methacrylic acid (2 moles) and the appropriate 4-substituted phenylacetic acid (1 mole) are added, and the reaction is stirred at room temperature overnight. Decarboxylation is effected by heating the mixture to 70° C. for 5 hours. After cooling to room temperature, the solution is diluted with water, and the solid product is collected by filtration and purified by recrystallization.

(b) Method 2

The appropriately substituted benzyl Wittig salt (2 moles) is dissolved in toluene, n-BuLi(2 moles) is added dropwise to the mixture, and the reaction is stirred at room temperature under argon atmosphere for 2 hours. The appropriate cinnamaldehyde (1 mole) in toluene solution is added dropwise, and stirring at room temperature is continued for 17 hours. Water is added to the reaction, and the solid product is collected by filtration, washed with 60% ethanol/water, and purified by recrystallization.

(3) Synthesis of monomer

An intermediate (1 mole) as prepared above, methacrylic anhydride (1 mole), and 4-N,N-dimethylaminopyridine heated at 80° C. until completion of the reaction. After cooling to room temperature, the solution is poured into water, and the solid monomer is collected by filtration and purified by recrystallization.

(4) Formation of copolymer

The comonomers (relative amounts to be determined by the desired polymer composition) are dissolved in a suitable solvent (10% solution by weight), and the solution is degassed with argon for 15 minutes. *AIBN (1 mole %) is added to the mixture, and this solution is degassed for an additional 15 minutes. The reaction is then heated at 70° C. and run under argon for 72 hours. After cooling to room temperature, the polymer is precipitated into a nonsolvent and collected by filtration. Purification is achieved by redissolving the polymer in an appropriate solvent and precipitating into a nonsolvent.

*Azo-bis-isobutyronitrile

The side chain polymers of the present invention have a unique combination of physical and optical properties. The side chain diphenylbutadiene electronic system in conjugation with electron-donating and electron-withdrawing substituents exhibits exceptional nonlinear optical susceptibility, e.g., a diphenylbutadiene-containing pendant side chain normally will exhibit a higher level of $\beta$ response than a diphenyl-containing or a stilbene-containing structure in conjugation with comparable electron-donating and electron-withdrawing substituents.

With respect to the different types of polymer pendant side chains represented in the present invention embodiments, the pendant side chains in which the electron-donating substituent is alicyclic in structure contribute superior physical properties to the respective polymers. This is exemplified by long term molecular orientation stability and retention of optical properties in a polymer film medium after poling with an external field.

Further, the alicyclic piperidyl and tetrahydroquinoline type donors are superior to the acyclic dialkylamino donors in their electron donating abilities because of the restricted configurational freedom inherent in the ring structures. By limiting the rotational degree of freedom about the N-C bond, the lone pair on the nitrogen atom of the amino group can be brought into greater planarity with the system of conjugation, increasing the group polarizability and transition dipole moment and thus the value of $\beta$ for the molecule. This effect is particularly evident in molecules containing the tetrahydroquinoline donor since free rotation about the N-C bond is completely eliminated by the fused bicyclic ring moiety. Thus, 6-tricyanovinyltetrahydroquinoline has a $\beta$ value of 7.34 relative to that of p-nitroaniline, while p-tricyanovinyl-N,N-dimethylaniline has a $\beta$ value of only 3.75 relative to that of p-nitroaniline.

A present invention polymer in the form of an isotropic medium has particular advantage in comparison with a medium of a liquid crystalline side chain polymer. A present invention optical medium exhibits exceptional optical transparency, while a liquid crystalline medium exhibits a light scattering effect because of deviation from ideal crystalline order. The efficiency of light transmission in an optical waveguide is diminished by light scattering.

The following examples are further illustrative of the present invention. The components and specific ingredients are presented as being typical, and various modifications can be derived in view of the foregoing disclosure within the scope of the invention.

EXAMPLE I

This Example illustrates the preparation of a homopolymer and copolymer (25/75) in accordance with the present invention.

The product solution then is washed with cold 2N HCl followed by saturated sodium bicarbonate, and the organic layer is filtered through cotton, and evaporated to dryness.

C. 4-(N-2-hydroxyethyl-N-ethylamino)cinnamaldehyde

To a solution of 235.3 g (1 mole) of 4-(N-2-acetoxyethyl-N-ethylamino)benzaldehyde in dimethylformamide is added 738.7 g (2.0 moles) of 1,3-dioxolan-2-ylmethyltributylphosphonium bromide in dimethylformamide, and the mixture is heated at 90° C. Potassium t-butoxide (224.4 g, 2.0 moles) is added, and heating is continued at 90° C. for 16 hours. After cooling to room temperature, the solution is poured into a sevenfold excess of water, the aqueous mixture is saturated with sodium chloride, The combined organics are dried over 4A sieves, filtered through cotton, and evaporated. The crude reaction product is dissolved in 3M HCl, and the reaction is stirred at room temperature for 16 hours. After neutralization with saturated sodium bicarbonate, the aqueous mixture is extracted with three portions of ether, and the combined organics are dried over 4A sieves, filtered through cotton, and evaporated to yield the cinnamaldehyde as an oil. The product is purified by flash chromatography (silica gel, 1:1 hexane:ethyl acetate).

D. 4-(N-2-hydroxyethyl-N-ethylamino)-4'-nitro-1,4-diphenyl-1,3-butadiene

A solution of 21.9 g (0.1 mole) of 4-(N-2-hydroxyethyl-N-ethylamino)cinnamaldehyde, 9.3 g (1 mole) of aniline, and 0.19 g (1 mole %) of toluenesulfonic acid in toluene is heated at reflux for 17 hours with azeotropic removal of water. After the mixture is cooled to room temperature, 17.2 g (0.2 mole) of methacrylic acid and

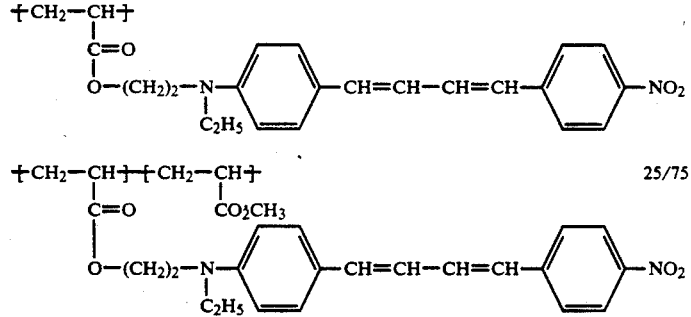

A. 4-(N-2-hydroxyethyl-N-ethylamino)benzaldehyde

To a three neck flask fitted with a mechanical stirrer, a thermometer, and a condenser, is added 124 g (1 mole) of 4-fluorobenzaldehyde, 89.1 g (1 mole) of 2-(N-ethylamino)ethanol, 138.2 g (1 mole) of anhydrous potassium carbonate, and dimethylsulfoxide. The mixture is heated at 95° C. for 3 hours. After cooling to room temperature, the solution is poured into a four-fold excess of ice water, and the solid product is collected by filtration and recrystallized from water.

B. 4-(N-2-acetoxyethyl-N-ethylamino)benzaldehyde

To a stirred solution of 193.2 g (1 mole) of 4-(N-2-hydroxyethyl-N-ethylamino)benzaldehyde in anhydride, 151.8 g (1.5 moles) of triethylamine, and 8.5 g (7 mole %) of 4-N,N-dimethylaminopyridine. The reaction mixture is stirred at room temperature for 16 hours.

18.1 g (0.1 mole) of 4-nitrophenylacetic acid are added to the solution, and the reaction is stirred at room temperature for 3 hours. The mixture then is heated at reflux for 16 hours. After cooling to room temperature, the solid diphenylbutadiene precipitates from solution and is collected by filtration and purified by recrystallization from ethanol.

E. Synthesis of acrylate monomer

A solution of 33.8 g (0.1 mole) of 4-(N-2-hydroxyethyl-N-ethylamino)-4'-nitro-1,4-diphenyl-1,3-butadiene, 12.6 g (0.1 mole) of acrylic anhydride, and 0.12 g (0.1 mole %) of 4-N,N-dimethylaminopyridine in pyridine is heated at 80° C. until the reaction is complete. After cooling to room temperature, the solution is poured into water, and the solid monomer is collected by filtration and purified by recrystallization from ethanol. The monomer exhibits a β of 121×10 esu as measured at 1.92 μm excitation wavelength.

F. Formation of homopolymer

The acrylate monomer from above is dissolved in dimethylsulfoxide (10% solution by weight), and the solution is degassed with argon for 15 minutes). AIBN (1 mole %) is added to the mixture, and the resultant solution is degassed for an additional 15 minutes. The reaction then is heated at 70° C. and run under argon for 16 hours. After cooling to room temperature, the polymer is precipitated into methanol and collected by filtration. Purification is achieved by redissolving the polymer in methylene chloride and precipitating into acetone. The polymer has a $T_g$ of about 200° C.

G. Formation of 25/75 copolymer

The acrylate monomer (9.5 g, 0.025 mole) and methyl acrylate (6.46 g, 0.075 mole) are dissolved in dimethylsulfoxide (10% solution by weight of solutes), and the solution is degassed for 15 minutes. AIBN (1 mole %) is added to the mixture, and the solution is degassed for an additional 15 minutes. The reaction then is heated at 70° C. and run under argon overnight. After cooling to room temperature, the polymer is precipitated into methanol and collected by filtration. Purification is achieved by redissolving the polymer in tetrahydrofuran and precipitating into acetone. The recovered copolymer has a $T_g$ of about 145° C.

Following the same procedures as described above, three homopolymers and three copolymers are produced, except that in procedure D 4-nitrophenylacetic acid is replaced by 4-cyanophenylacetic acid, 4-dicyanovinylphenylacetic acid or 4-tricyanovinylphenylacetic acid, respectively.

EXAMPLE II

This Example illustrates the preparation of a copolymer (50/50) in accordance with the present invention.

ture is then heated at 95° C. until the reaction is complete. After cooling to room temperature, the solution is poured into a four-fold excess of ice water, and the solid product is collected by filtration and purified by recrystallization from tetrahydrofuran/benzene.

(2) 4-(N-4-acetoxybutyl-N-butylamino)benzaldehyde

To a stirred solution of 249.4 g (1 mole) of 4-(N-4-hydroxybutyl-N-butylamino)benzaldehyde in dichloromethane are added 153.1 g (1.5 moles) of acetic anhydride, 151.8 g (1.5 moles) of triethylamine, and 8.5 g (7 mole %) of 4-N,N-dimethylaminopyridine. The reaction mixture is stirred at room temperature for 16 hours. The product solution is washed with cold 2N HCl and then with filtered through cotton, and evaporated to dryness.

(3) 4-(N-4-hydroxybutyl-N-butylamino)cinnamaldehyde

To a solution of 29.1 g (0.1 mole) of 4-(N-4-acetoxybutyl-N-butylamino)benzaldehyde in dimethylformamide is added 73.9 g (0.2 mole) of 1,3-dioxolan-2-ylmethyltributylphosphonium bromide in dimethylformamide, and the mixture is heated at 90° C. Potassium t-butoxide (22.4 g, 0.2 mole) is added, and heating is continued at 90° C. for 16 hours. After cooling to room temperature, the product solution is poured into a seven-fold excess of water, the aqueous mixture is saturated with sodium chloride and the solution is extracted with three portions of ether. The combined organics are dried over 4A sieves, filtered through cotton, and evaporated. The crude reaction product is then dissolved in 3M HCl, and the reaction is stirred at room temperature for 16 hours. After neutralization with saturated sodium bicarbonate, the aqueous mixture is extracted with three portions of ether, and the combined organics are passed through silica gel, dried over 4A sieves, filtered through cotton, and evaporated to yield compound A. The product is purified by flash chromatography (silica gel, 1:1 hexane:ethyl acetate).

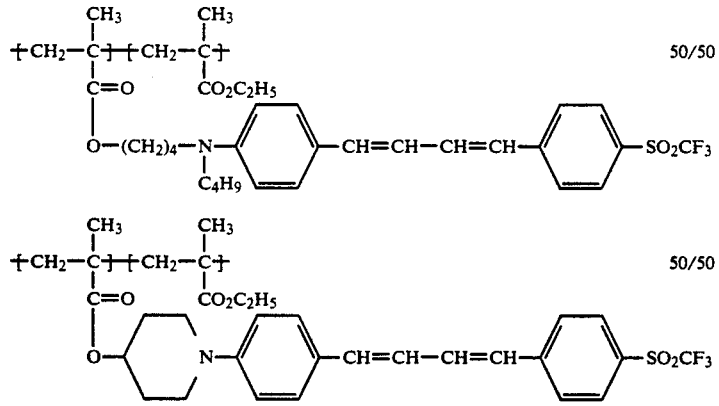

A. Synthesis of 4-(N-4-hydroxybutyl-N-butylamino)cinnamaldehyde (compound A)

(1) 4-(N-4-hydroxybutyl-N-butylamino)benzaldehyde

To a three neck flask fitted with a mechanical stirrer, a thermometer, and a condenser, is added 124 g (1 mole) of 4-fluorobenzaldehyde, 145.3 g (1 mole) of N-butyl-N-4-hydroxybutylamine, 138.2 g (1 mole) of anhydrous potassium carbonate, and dimethylsulfoxide. The mix-

B. Synthesis 4-triflylbenzyltriphenylphosphonium bromide (compound B)

(1) 4-Triflyltoluene

Dry toluene and 13.3 g of anhydrous AlCl 0.11 mole) are cooled to 0° C. To this mixture is added dropwise 28.2 g (0.1 mole) of trifluoromethanesulfonic anhydride in dry toluene. The reaction is allowed to warm to room temperature and is stirred for 16 hours. The product solution is poured into water, and the mixture is extracted with ether. The ether layer is washed with water and saturated sodium chloride solution and dried over 4A sieves. Ether and excess toluene are removed in vacuo, and the product is purified by distillation.

(2) 4-Triflyl-alpha-bromotoluene

A stirred solution of 22.4 g (0.1 mole) of 4-triflyltoluene, 178 g (0.1 mole) of N-bromosuccinimide, and 0.48 g (0.2 mole %) of benzoyl peroxide in carbon tetrachloride is heated at reflux for 20 hours. After cooling to room temperature, the reaction is diluted by the addition of carbon tetrachloride, and the solid byproducts are removed by filtration. The filtrate is concentrated in vacuo, and the product is purified by recrystallization from benzene.

(3) 4-Triflylbenzyltriphenylphosphonium bromide

A solution of 30.3 g (0.1 mole) of 4-triflyl-alpha-bromotoluene and 28.8 g (0.1 mole) of triphenylphosphine in xylene is heated at reflux for 19 hours. 4-Triflylbenzyltriphenylphosphonium bromide is then isolated by filtration, washed with additional portions of xylene, and dried.

C. Synthesis of 4-(N-4-hydroxybutyl-N-butylamino)-4'-triflyl 1,4-diphenyl-1,3-butadiene (compound C)

To a stirred solution of 110 g (0.2 mole) of 4-triflylbenzyltriphenylphosphonium bromide in toluene is added dropwise 0.2 moles of n-BuLi at room temperature. After 2 hours a solution of 27.5 g (0.1 mole) of 4[N-4-hydroxybutyl-N-butylamino]cinnamaldehyde in toluene is added dropwise to the mixture, and the reaction is stirred for 18 hours at room temperature. Water is added, and compound C is isolated by vacuum filtration, washed with 60% ethanol/water, dried under vacuum, and purified by recrystallization from ethanol.

(1) Synthesis of methacrylate monomer

A stirred solution of 48.1 g (0.1 mole) of 4-(N-4-hydroxybutyl-N-butylamino)-4'-triflyl-1,4-diphenyl-1,3-butadiene, 15.4 g (0.1 mole) of methacrylic anhydride, and 0.12 g (0.1 mole %) of 4-N,N-dimethylaminopyridine in pyridine is heated at 80° C. for 2 hours. After cooling to room temperature, the product solution is poured into water, and the solid monomer is collected by filtration and purified by recrystallization from ethanol/benzene. The monomer exhibits a β of 144×10 esu as measured at 1.91 μm excitation wavelength.

(2) Formation of 50/50 copolymer

The methacrylate monomer (27.4 g, 0.05 mole) from above and ethyl methacrylate (5.7 g, 0.050 mole) are dissolved in dimethylsulfoxide (10% solution by weight of solutes), and the solution is degassed for 15 minutes. AIBN (1 mole %) is added to the mixture, and this solution is degassed for an additional 15 minutes. The reaction then is heated at 70° C. and run under argon for 16 hours. After cooling to room temperature, the polymer is precipitated into ethanol and collected by filtration. Purification is achieved by redissolving the polymer in methylene chloride and precipitating into ethanol. The copolymer has a $T_g$ of about 150° C.

A second 50/50 copolymer is synthesized by following the same procedures described above, except that in procedure A(1) 4-hydroxypiperidine is utilized in place of N-butyl-N-4-hydroxybutylamine.

EXAMPLE III

This Example illustrates the preparation of a copolymer (60/40) in accordance with the present invention.

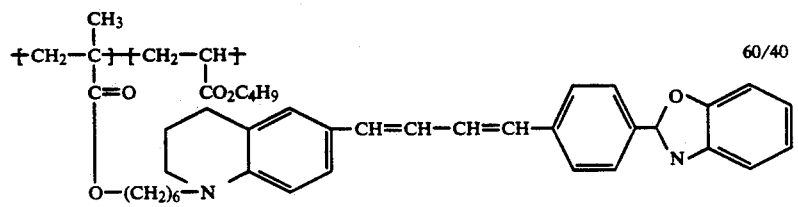

A. Synthesis of 3-(N-hydroxyhexyl-1,2,3,4-tetrahydroquinolin-6-yl)acrolein (compound A)

(1) N-Hydroxyhexyl-1,2,3,4-tetrahydroquinoline

A stirred solution of 133.2 g (1 mole) of 1,2,3,4-tetrahydroquinoline, 181.1 g (1 mole) of 6-bromohexanol, and 138.2 g (1 mole) of potassium carbonate in toluene is heated at 80° C. for 3 hours. The solution is cooled to room temperature, and the solids are removed by filtration. The solvent is removed in vacuo, and the N-hydroxyhexyltetrahydroquinoline is purified by chromatography (silica gel, hexane:ethyl acetate).

(2) N-Acetoxyhexyl-1,2,3,4-tetrahydroquinoline

To a stirred solution of 233.4 g (1 mole) of N-hydroxyhexyltetrahydroquinoline and 153.1 g (1.5 moles) of acetic anhydride in dichloromethane are added 151.8 g (1.5 moles) of triethylamine and 8.5 g (1 mole %) of 4-N,N-dimethylaminopyridine, and the reaction is stirred at room temperature for 3 hours. The product solution is washed with cold 2N HCl followed by saturated sodium bicarbonate, and the organic layer is filtered through cotton and evaporated.

(3) N-Acetoxyhexyl-1,2,3,4-tetrahydroquinoline-6-carboxaldehyde

Dimethylformamide (31 ml, 0.4 mole) is cooled to 0° C., and 15.3 g (0.1 mole) of phosphorus oxychloride is added dropwise with stirring. After the addition of phosphorus oxychloride is complete, 27.5 g, (0.1 mole) of N-acetoxyhexyl-1,2,3,4-tetrahydroquinoline is added dropwise to the mixture at 0° C. The reaction mixture is heated at 95° C. for 2-3 hours. After cooling to room temperature, the product solution is poured into a seven-fold excess of water. The aqueous mixture is made basic to pH paper and extracted with diethyl ether. The combined organic extracts are washed with water, filtered through cotton, and evaporated to yield the product aldehyde.

(4)
3-(N-Hydroxylhexyl-1,2,3,4-tetrahydroquinolin-6-yl)acrolein

To a solution 30.3 g (0.1 mole) of N-acetoxyhexyl-1,2,3,4-tetrahydroquinoline-6-carboxaldehyde in dimethylformamide is added 7.4 g (0.2 mole) of 1,3-dioxolan-2-ylmethyltributylphosphonium bromide in dimethylformamide with magnetic stirring, and the mixture is heated at 90° C. Potassium t-butoxide (22.4 g, 0.2 mole) is added, and heating is continued at 90° C. for 16 hours. After cooling to room temperature, the solution is poured into a seven-fold excess of water. The aqueous mixture is saturated with sodium chloride, and the mixture is extracted with three portions of ether. The combined organics are dried over 4A sieves, filtered through cotton, and evaporated. The crude reaction product is then dissolved in 3M HCl, and the reaction is stirred at room temperature for 16 hours. After careful neutralization with saturated sodium bicarbonate, the aqueous mixture is extracted with three portions of ether, and the combined organics are passed through silica gel, dried over 4A sieves, filtered through cotton, and evaporated to yield 3-(N-hydroxyhexyl-1,2,3,4-tetrahydroquinolin-6-yl)acrolein.

B. Synthesis of 4-(benzoxazol-2-yl)tolyltriphenylphosphonium bromide (compound B)

(1) 2-(4-Methylphenyl)benzoxazole

A solution of 12 g (0.1 mole) of 4-tolualdehyde and 10.9 g (0.1 mole) of 2-aminophenol in toluene is heated at reflux with azeotropic removal of water. After 20 hours at reflux, the reaction is cooled to room temperature, 44.3 g (0.1 mole) of lead tetraacetate is added, and the mixture is stirred at room temperature overnight. The solids are removed by filtration, and the filtrate is swirled with basic alumina. Removal of the solvent in vacuo affords the solid product which is then purified by recrystallization from benzene.

(2) 2-(4-Bromomethylphenyl)benzoxazole

A stirred solution of 20.9 g (0.1 mole) of 2-(4-methylphenyl)benzoxazole, 17.8 g (0.1 mole) of N-bromosuccinimide, and 0.4 g (0.2 mole %) of benzoyl peroxide in carbon tetrachloride is heated at reflux for 20 hours. After cooling to room temperature, the reaction is diluted by the addition of carbon tetrachloride, and the solid byproducts are removed by filtration. The filtrate is concentrated in vacuo, and the product is purified by recrystallization from benzene.

(3) 4-(Benzoxazol-2-yl)tolyltriphenylphosphonium bromide

A stirred solution of 28.8 g (0.1 mole) of 2-(4-bromomethylphenyl)benzoxazole and 28.8 g (0.1 mole) of triphenylphosphine in xylene is heated at reflux for 19 hours. The product is then isolated by filtration, washed with additional portions of xylene, and dried.

C. Synthesis of 1-(N-hydroxyhexyl-1,2,3,4-tetrahydroquinolin-6-yl)-4-(4-benzoxazol-ylphenyl)-1,3-butadiene (compound C)

To a stirred mixture of 110 g (0.2 mole) of 4-(benzoxazol-2-yl)tolyltriphenylphosphonium bromide in toluene is added dropwise 0.2 mole of n-BuLi at room temperature. After 2 hours a solution of 28.7 g (0.1 mole) of 3-(N-hydroxyhexyl-1,2,3,4-tetrahydroquinolin-6-yl)acrolein in toluene is added dropwise to the mixture, and the reaction is stirred for 18 hours at room temperature. Water is added, and the solids are isolated by vacuum filtration, washed with 60% ethanol/water, and dried under vacuum. The product is purified by recrystallization from benzene.

(1) Synthesis of methacrylate monomer

To a stirred solution of 47.8 g (0.1 mole) of 1-[N-hydroxyhexyl-1,2,3,4-tetrahydroquinolin-6-yl]-4-(4-benzoxazol-2-ylphenyl)-1,3-butadiene in pyridine are added 0.12 g (0.1 mole %) of 4-N,N-dimethylaminopyridine and 15.4 g (0.1 mole) of methacrylic anhydride. The reaction is heated at 80° C. until completion. After cooling to room temperature, the solution is poured into water, and the solid monomer is collected by filtration and purified by recrystallization from ethanol. The monomer exhibits a $\delta$ of $190 \times 10$ esu as measured at 1.91 $\mu$m excitation wavelength.

(2) Formation of 60:40 copolymer with butylacrylate

The monomer from above (32.8 g, 0.06 mole) and butylacrylate (5.1 g, 0.04 mole) are dissolved in dimethylsulfoxide (10% solution by weight), and the solution is degassed for 15 minutes. AIBN (1 mole %) is added to the mixture, and the solution is degassed for an additional under argon for 16 hours. After cooling to room temperature, the polymer is precipitated into methanol and collected by filtration. Purification is achieved by redissolving the polymer in methylene chloride and precipitating it in acetone. The copolymer has a $T_g$ of about 186° C.

Following the same procedures as described above, a copolymer is produced except that in procedure B(3) the 2-(4-bromomethylphenyl)benzoxazole reactant is replaced by 2-(4-bromomethylphenyl)benzthiazole.

EXAMPLE IV

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 $\mu$m layer of 99.999% purity aluminum is deposited on the wafer.

AZ-1518 positive photoresist (Hoechst) is spin-coated on the aluminum-coated wafer with a Solitec model 5100 coater. A 1.5 $\mu$m photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 $\mu$m radiation (70 mJ/cm$^2$).

The mask is removed, and a thin piece of silicon (1 cm$\times$2 cm) is placed on the surface of the patterned photoresist as a protective shield, and the combination is exposed to 70 mJ/cm$^2$ of 405 $\mu$m radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer alcohol (75% hydrolyzed) in water by spin-coating at 5000 rpm for 30 seconds, and the cladding layer is dried in a vacuum oven at 110° C. for two hours.

A nonlinear optically active organic layer of 1.65 μm thickness is spin-coated on the cladding layer at 3000 rpm. The spin-coating medium is a 20% solution of the Example II copolymer (50/50) of side chain monomer-/ethyl methacrylate in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 μm coating of aluminum is deposited as an electrode layer on the upper cladding layer.

The fabricated waveguide is placed in a Mettler hot stage, and the unit is raised to 90° C. at 1° C./min. A DC field of 70V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $3 \times 10$ esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, a 0.5–1% amount of the fundamental beam is converted into an observed second harmonic radiation.

What is claimed is:

1. An isotropic polymer which is characterized by recurring monomeric units corresponding to the formula:

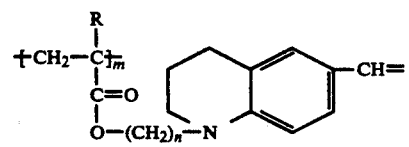

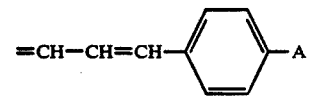

where R is hydrogen or a $C_1$-$C_4$ substituent; m is an integer of at least 5; n is an integer between about 1-20 and A is —CN, —NO$_2$, —CH=C(CN)$_2$, —C(CN)=C(CN)$_2$, —SO$_2$CF$_3$,

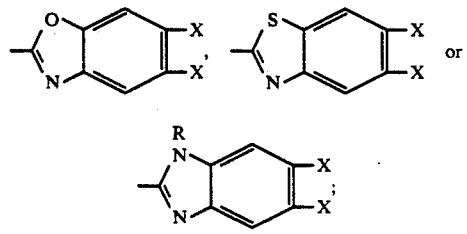

and X is —H, —CN, —NO$_2$ or —CF$_3$.

* * * * *